A. D. HOFFMAN.
GAME-COUNTER.

No. 180,235. Patented July 25, 1876.

Attest.
P. B. Warner
O. H. Adix

Inventor:
Austin D. Hoffman
By L. d. Chapin,
Atty

UNITED STATES PATENT OFFICE.

AUSTIN D. HOFFMAN, OF CHICAGO, ILLINOIS, ASSIGNOR OF ONE-THIRD HIS RIGHT TO SAMUEL A. ROSS, OF SAME PLACE.

IMPROVEMENT IN GAME-COUNTERS.

Specification forming part of Letters Patent No. 180,235, dated July 25, 1876; application filed December 8, 1875.

*To all whom it may concern:*

Be it known that I, AUSTIN D. HOFFMAN, of Chicago, in the county of Cook and State of Illinois, have invented a new and useful Improvement in Game-Counters, of which the following is a specification:

The present invention consists of a disk and stand provided with a plunger, which is pushed down to turn a hand moving on the disk, to indicate from 1 to 10, or more.

The lower end of the plunger is provided with an arm, which passes down on one side of a cam, and up on the other side of it; and by means of this cam it is caused to swing far enough on the line of a circle at each movement to catch onto another cog on a toothed collar, carrying a hand on the collar from one figure to another on the disk.

The plunger is inclosed in the sleeve attached to the disk, and is made to have an upward movement by a coil-spring surrounding it.

The cam is pivoted to a bridge, which allows it to oscillate in a horizontal plane, and it is held in position to operate by a spring and an arm attached to the bridge, and having bearings on the inside of the stand.

The arm on the plunger is held in place by a guide projecting down from the under side of the disk.

Figure 2:
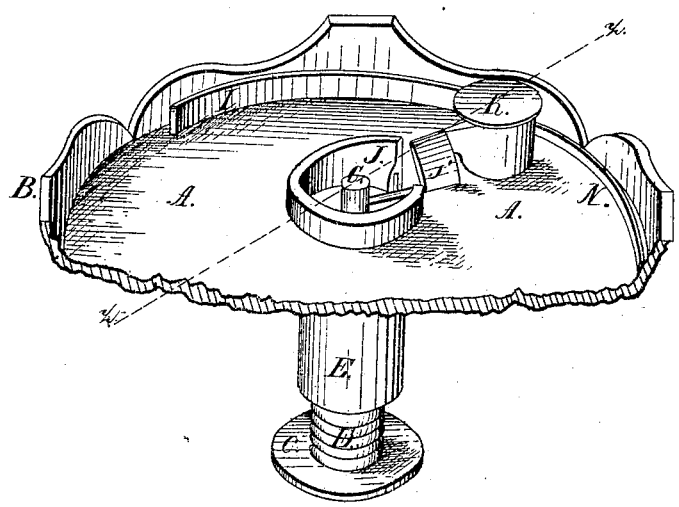
Figure 1:
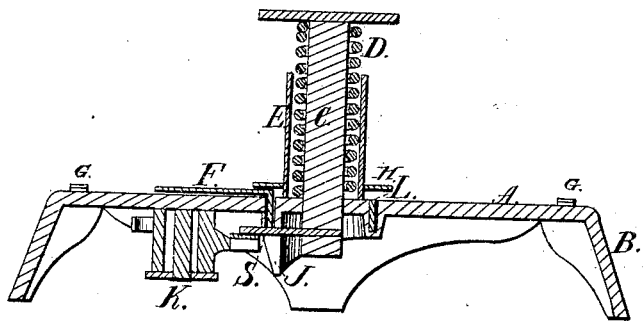
Figure 3:

In the drawings, Figure 1 is a central sectional elevation of my improvement on line Z, Fig. 2. Fig. 2 is an inverted view of the same. Fig. 3 is a perspective view of the toothed collar removed from the other part.

A represents a metal disk, terminating in the stand B, and provided on its upper side with figures, 1 2 3 4 5 6 7 8 9 0, at equal distances apart, their positions being shown at G. More or less figures may be made on the disk, providing the collar L is made of such size as to have a corresponding number of cogs. A sleeve, E, projects up from the disk A, and inside thereof is placed a plunger, C, surrounded by a coil-spring, D. The lower end of the plunger is provided with an arm, S, which moves a cam, J', by passing down one side of it, the coil-spring D bringing the arm back on the other side of it. The arm, in its upward movement, engages a cog on the toothed collar L, and by its horizontal movement, caused by the coil-spring D, moves the collar round far enough to bring the hand F from one figure to another on the disk, as will be seen at Figs. 1 and 3. This collar is placed in a recess in the disk A, and under a supporting-cap, H, fastened to the sleeve E. The cam J' has an inclined position relative to the under side of the disk, so that the arm S will readily swing it to one side, and it is pivoted to a bridge, K, and is kept in position by a spring, N, on one side, and an arm, I, on the other, both being attached to the bridge.

I claim as new, and desire to secure by Letters Patent of the United States—

The cam J', in combination with the arm S, plunger C, toothed collar L, provided with the arm F, sleeve E, springs D and N, and arm I, arranged with reference to the numbered disk A, as specified.

AUSTIN D. HOFFMAN.

Witnesses:
O. H. ADIX,
G. L. CHAPIN.